US012754560B2

(12) United States Patent
Lu et al.

(10) Patent No.: US 12,754,560 B2
(45) **Date of Patent: *Oct. 6, 2026**

(54) UNMANNED AERIAL VEHICLE SEVERE LOW-POWER PROTECTION METHOD AND UNMANNED AERIAL VEHICLE

(71) Applicant: AUTEL ROBOTICS CO., LTD., Shenzhen (CN)

(72) Inventors: Minghua Lu, Shenzhen (CN); Tianbao Zhang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 183 days.

This patent is subject to a terminal disclaimer.

(21) Appl. No.: 18/591,542

(22) Filed: Feb. 29, 2024

(65) Prior Publication Data

US 2025/0251730 A1 Aug. 7, 2025

Related U.S. Application Data

(63) Continuation of application No. 17/811,268, filed on Jul. 7, 2022, now Pat. No. 11,947,366, which is a
(Continued)

(30) Foreign Application Priority Data

Jan. 9, 2020 (CN) ......................... 202010023204.2

(51) Int. Cl.
*G05D 1/606* (2024.01)
*B64C 39/02* (2023.01)
(Continued)

(52) U.S. Cl.
CPC ........... *G05D 1/606* (2024.01); *B64C 39/024* (2013.01); *G05D 1/223* (2024.01); *G05D 1/81* (2024.01);
(Continued)

(58) Field of Classification Search
None
See application file for complete search history.

(56) References Cited

U.S. PATENT DOCUMENTS 10,370,093 B1 * 8/2019 Beckman ................ G08G 5/80
10,372,124 B2 * 8/2019 Shi ........................ G05D 1/0088
(Continued)

FOREIGN PATENT DOCUMENTS

CN 108803645 A * 11/2018 ............ G05D 1/101

OTHER PUBLICATIONS

English translation of CN-108803645-A (Year: 2023).*

*Primary Examiner* — Amelia Vorce

(57) ABSTRACT

Embodiments of the present invention are an unmanned aerial vehicle (UAV) severe low-power protection method and a UAV. The method includes: first acquiring ground environment information when the UAV is in a severe low-power protection state, and then obtaining landing safety judgment information according to the ground environment information, and further controlling a flight state of the UAV according to the landing safety judgment information to realize a safe landing of the UAV The foregoing method reduces the probability of explosion of the UAV, avoids injury accidents, and improves flight safety when the UAV is in a severe low-power state.

18 Claims, 4 Drawing Sheets

Related U.S. Application Data continuation of application No. PCT/CN2020/133963, filed on Dec. 4, 2020.

(51) Int. Cl.

| | |
|---|---|
| ***B64U 70/00*** | (2023.01) |
| ***B64U 101/30*** | (2023.01) |
| ***G05D 1/223*** | (2024.01) |
| ***G05D 1/81*** | (2024.01) |

(52) U.S. Cl.

CPC .......... *B64U 70/00* (2023.01); *B64U 2101/30* (2023.01); *B64U 2201/00* (2023.01); *B64U 2201/20* (2023.01)

(56) References Cited

U.S. PATENT DOCUMENTS

| | | | | |
|---|---|---|---|---|
| 2004/0193334 | A1* | 9/2004 | Carlsson | G05D 1/0022 701/9 |
| 2017/0069214 | A1* | 3/2017 | Dupray | G08G 5/56 |
| 2018/0114450 | A1* | 4/2018 | Glaab | B64U 70/00 |
| 2018/0321690 | A1* | 11/2018 | Vander Lind | B64D 31/06 |
| 2019/0187168 | A1* | 6/2019 | Mukai | G01W 1/04 |
| 2020/0265731 | A1* | 8/2020 | Lev | G08G 5/32 |
| 2020/0307390 | A1* | 10/2020 | Clark | B60L 3/12 |
| 2021/0094180 | A1* | 4/2021 | Szafir | G05D 1/0016 |
| 2021/0122467 | A1* | 4/2021 | Rezvani | B64U 80/25 |
| 2021/0192934 | A1* | 6/2021 | Ma | G08C 17/02 |
| 2021/0271221 | A1* | 9/2021 | Wang | G05B 19/19 |
| 2022/0274717 | A1* | 9/2022 | Akanuma | G05D 1/0676 |

* cited by examiner

UNMANNED AERIAL VEHICLE SEVERE LOW-POWER PROTECTION METHOD AND UNMANNED AERIAL VEHICLE

CROSS-REFERENCE TO RELATED APPLICATIONS

This application is a continuation of U.S. Ser. No. 17/811,268, filed Jul. 7, 2022, which is a continuation of International Application No. PCT/CN2020/133963, filed Dec. 4, 2020, which claims the benefit of and priority to Chinese Patent Application No 202010023204.2, filed Jan. 9, 2020, the entireties of which are hereby incorporated herein by reference.

TECHNICAL FIELD

The present invention relates to the field of unmanned aerial vehicle (UAV) technologies, and in particular, to a UAV severe low-power protection method and a UAV.

BACKGROUND

A UAV battery is an energy source to sustain motion of a UAV. Taking a four-rotor UAV for example, a UAV controller adjusts an output voltage of a battery by sending an electronic adjustment control command, and controls motors to achieve an expected speed, thereby achieving a control goal. During flight of the UAV in the air, battery power continues to decrease.

It takes a certain amount of power for the UAV to land on the ground from a current flight altitude. It is extremely dangerous when the battery power of the UAV is lower than the power required to land the UAV. Therefore, in this situation, most UAVs forcibly descend until the UAV lands on the ground. However, this strategy causes the pilot to lose control over the UAV Due to unknown ground conditions, the UAV may fall into the water, on the tree, or on the road, most likely causing an explosion of the UAV or an injury accident.

SUMMARY

To solve the foregoing technical problem, embodiments of the present invention provide a UAV severe low-power protection method and a UAV, reducing the probability of explosion of the UAV and improves flight safety when the UAV is in a severe low-power state.

According to a first aspect of present application, provided the following technical solutions: a UAV severe low-power protection method, applicable to a UAV. The UAV severe low-power protection method includes:

acquiring ground environment information when the UAV is in a severe low-power protection state;

obtaining landing safety judgment information according to the ground environment information; and controlling a flight state of the UAV according to the landing safety judgment information to realize a safe landing of the UAV.

Optionally, the landing safety judgment information includes safe landing information and dangerous landing information; and the controlling a flight state of the UAV according to the landing safety judgment information to realize a safe landing of the UAV includes:

controlling the UAV to hover and keep still when the landing safety judgment information is dangerous landing information;

acquiring a manual control command, and controlling the UAV to deviate from a current position according to the manual control command; and keeping acquiring the ground environment information, and controlling the flight state of the UAV to realize the safe landing of the UAV according to the landing safety judgment information.

Optionally, the method further includes:

the controlling the UAV to hover and keep still when the landing safety judgment information is dangerous landing information includes:

acquiring a hovering control command and a corresponding flag bit when the landing safety judgment information is dangerous landing information; and controlling the UAV to hover and keep still according to the hovering control command and the flag bit.

Optionally, before the keeping acquiring the ground environment information, and controlling the flight state of the UAV according to the landing safety judgment information to realize the safe landing of the UAV includes:

triggering a re-landing command after a preset interval time since detection of a speed change of the UAV; and controlling the UAV to land safely according to the re-landing command.

Optionally, the controlling the UAV to hover and keep still according to the hovering control command and the flag bit includes:

controlling an altitude and a position of the UAV to keep unchanged according to the hovering control command and the flag bit.

Optionally, the method further includes: acquiring a current flight altitude of the UAV when the UAV is in a severe low-power protection state;

determining whether the current flight altitude exceeds a preset altitude threshold; and in response to determining the current flight altitude exceeds a preset altitude threshold, shielding an upward flight control command.

According to a second aspect of present application, provided the following technical solutions: a UAV. The UAV includes: a body;

arms, connected to the body;

a power apparatus, disposed on the arms, configured to provide flight power for the UAV; and a flight controller, disposed on the arms;

where the flight controller includes:

at least one processor; and a memory communicatively connected to the at least one processor, the memory storing instructions executable by the at least one processor, the instructions, when executed by the at least one processor, enabling the at least one processor to execute the foregoing UAV severe low-power protection method.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represent similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "up", "down", "inside", "outside", and "bottom" used in this specification are based on orientation or position relationships shown in the accompanying drawings, and are merely used for ease and brevity of illustration and description, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in this specification are the same as that usually understood by persons skilled in the technical field to which the present invention belongs. The terms used in this specification of the present invention are merely intended to describe specific implementations rather than limit the present invention. The term "and/or" used in this specification includes any or all combinations of one or more related listed items.

In addition, technical features involved in different embodiments of the present invention described below may be combined together if there is no conflict.

The following examples illustrate an disclosure environment of the UAV severe low-power protection method and apparatus.

Figure 1:
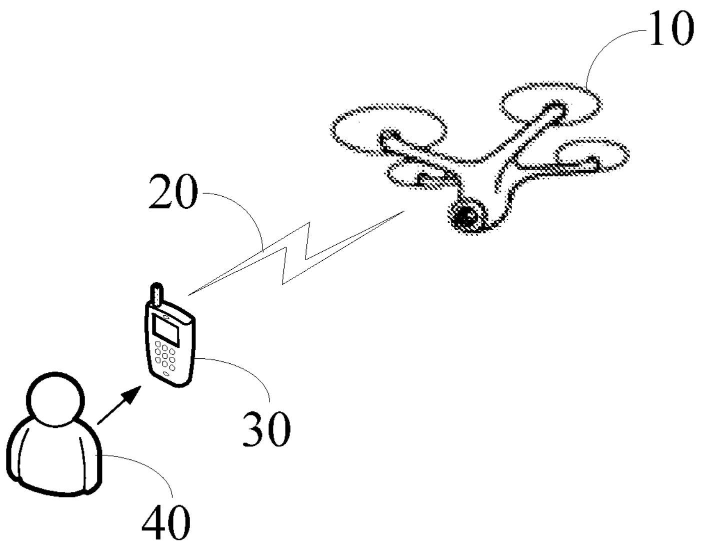
FIG. 1 is a schematic diagram of an disclosure environment according to an embodiment of the present invention.

FIG. 1 is a schematic diagram of an disclosure environment of a UAV severe low-power protection system according to an embodiment of the present invention. As shown in FIG. 1, the disclosure environment includes a UAV 10, a wireless network 20, an intelligent terminal 30 and a user 40. The user 40 can operate the intelligent terminal 30 to control the UAV 10 through the wireless network 20.

The UAV 10 may be any type of powered UAV, including but not limited to a rotor UAV, a fixed-wing UAV, an umbrella-wing UAV, a flapping-wing UAV, a helicopter model and the like. In this embodiment, a multi-rotor UAV is used as an example for description.

The UAV 10 may have a corresponding volume or power according to actual needs, thereby providing load capacity, flight speed and flight range that can meet use requirements. One or more sensors may further be added to the UAV 10 so that the UAV 10 can collect corresponding data.

For example, in this embodiment, the UAV 10 is provided with at least one sensor among an accelerometer, a gyroscope, a magnetometer, a GPS navigator, and a vision sensor.

The UAV 10 further includes a flight controller. The flight controller serves as a control core of UAV flight and data transmission and the like, and integrates one or more modules to execute corresponding logic control programs. For example, the flight controller can be configured to execute the foregoing UAV severe low-power protection method.

The intelligent terminal 30 may be any type of smart device used for establishing a communication connection with the UAV 10, such as a mobile phone, a tablet computer, or a smart remote control. The intelligent terminal 30 may be equipped with one or more different interactive devices of the user 40 to collect commands from the user 40 or to display and feed information back to the user 40.

These interactive devices include, but are not limited to: a button, a display screen, a touch screen, a speaker, and a remote joystick. For example, the intelligent terminal 30 may be equipped with a touch display screen. A telecommand for the UAV 10 is received from the user 40 through the touch display screen, and image information obtained by aerial photography is displayed to the user 40 through the touch display screen. The user 40 can also switch the image information currently displayed on the display screen through a remote control touch screen.

In some embodiments, an existing image vision processing technology may also be integrated between the UAV 10 and the intelligent terminal 30 to further provide a more intelligent service. For example, the UAV 10 can collect images through a dual-light camera, and the images are analyzed by the intelligent terminal 30, thereby realizing gesture control of the UAV 10 by the user 40.

The wireless network 20 may be a wireless communication network for establishing a data transmission channel between two nodes based on any type of data transmission principle, such as a Bluetooth network, a WiFi network, or a wireless cellular network in different signal frequency bands, or a combination thereof.

Figure 2:
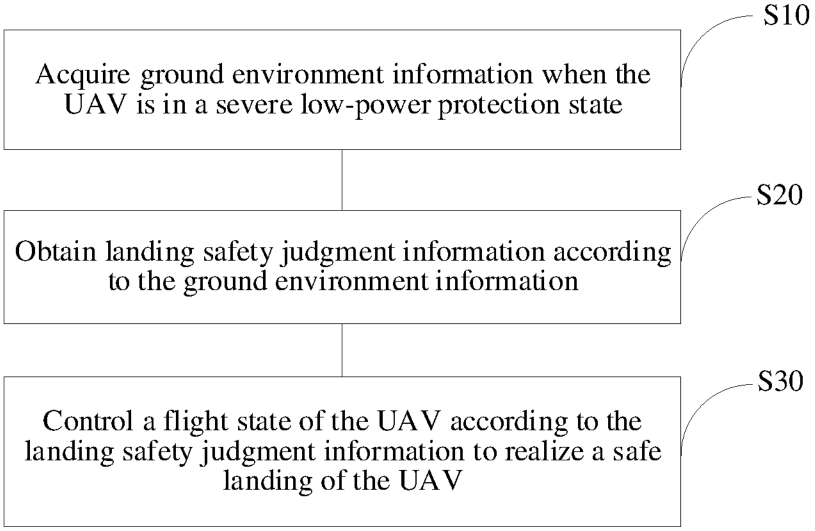
FIG. 2 is a schematic flowchart of a UAV severe low-power protection method according to an embodiment of the present invention.

FIG. 2 is an embodiment of a UAV severe low-power protection method according to an embodiment of the present invention. As shown in FIG. 2, the UAV severe low-power protection method can be executed by a flight controller of the UAV, including the following steps:

S10. Acquire ground environment information when the UAV is in a severe low-power protection state.

Specifically, the UAV is loaded with a ground detection sensor detecting the ground environment information. The ground detection sensor may be a commonly used monocular or binocular camera. Preferably, in this embodiment, the ground detection sensor is a split camera assembly.

Specifically, in this embodiment, the main body of the UAV is provided with a plurality of struts on which rotors are mounted. Each of the struts is connected to the other struts to form joints. The split camera assembly includes: a main control board, a connecting wire and a camera. The main control board is arranged at the joints. The camera is arranged between two adjacent struts of the main body of the UAV. One end of the connecting wire is connected to the main control board, and the other end of the connecting wire is connected to the camera. One end of the connecting wire is connected to the main control board, and the other end of the connecting wire is connected to the camera, so that image data obtained by the camera can be transmitted to the main control board through the connecting wire. The main control board is arranged at the joints formed by connecting each of the struts of the main body of the UAV with the rest of the struts, and the camera is arranged between two adjacent struts of the main body of the UAV. In this way, while normal transmission of the image data obtained by the camera, by arranging the camera and the main control board at different positions of the main body of the UAV, the weight carried by the main body of the UAV is shared by different positions, and a force balance is achieved. Therefore, while the miniaturization of the UAV is realized, the UAV is effectively prevented from shaking during a flight process, which is more conducive to obtaining the ground environment information.

S20. Obtain landing safety judgment information according to the ground environment information.

The landing safety judgment information includes safe landing information and dangerous landing information.

When the ground detection sensor detects that the ground is in a state unsuitable for landing (such as water, bushes and people), the UAV may fall into the water, on the trees, or on the pedestrians, which is likely to cause an explosion of the UAV or an injury accident. Therefore, the obtained landing safety judgment information is dangerous landing information.

When the ground detection sensor detects that the ground is in a state suitable for landing (such as ground), the obtained landing safety judgment information is safe landing information.

S30. Control a flight state of the UAV according to the landing safety judgment information to realize a safe landing of the UAV.

Specifically, when the landing safety judgment information is dangerous landing information, the UAV is first controlled to hover and keep still; then a manual control command is acquired, and the UAV is controlled to deviate from a current position according to the manual control command; then, the UAV is controlled to keep landing to realize a safe landing of the UAV.

Therefore, in this embodiment, ground environment information is first acquired when the UAV is in a severe low-power protection state, then landing safety judgment information is obtained according to the ground environment information, and further, a flight state of the UAV is controlled according to the landing safety judgment information to realize a safe landing of the UAV. The foregoing method reduces the probability of explosion of the UAV, avoids injury accidents, and improves flight safety when the UAV is in a severe low-power state.

Figure 3:
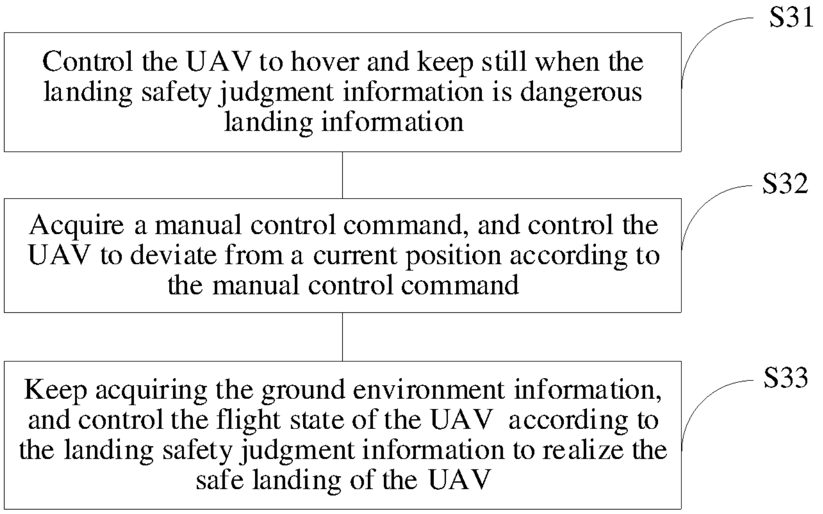
FIG. 3 is a schematic flowchart of S30 in FIG. 2.

To better control the flight state of the UAV according to the landing safety judgment information to realize the safe landing of the UAV, in some embodiments, referring to FIG. 3, S30 includes the following steps:

S31: Control the UAV to hover and keep still when the landing safety judgment information is dangerous landing information.

Specifically, the UAV is controlled so that the altitude and position of the UAV are kept unchanged when the landing safety judgment information is dangerous landing information.

S32. Acquire a manual control command, and control the UAV to deviate from a current position according to the manual control command.

Specifically, the UAV is controlled by the user operating the intelligent terminal through the wireless network, so that a manual control command is acquired by the UAV, and the UAV is controlled to deviate from a current position according to the manual control command. That is, the UAV is controlled to deviate from an area currently unsuitable for landing according to the manual control command, so that the UAV flies to an area suitable for landing.

Figure 4:
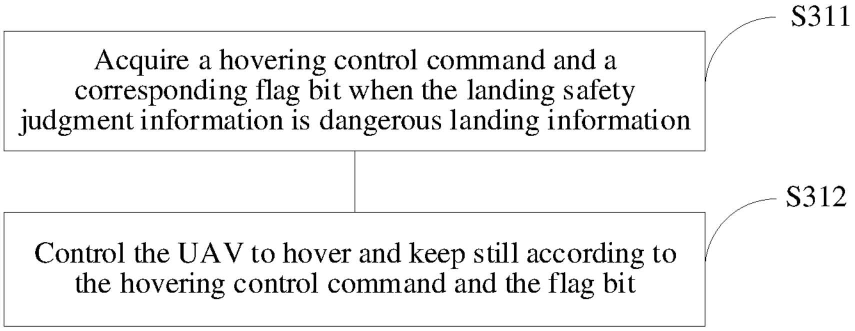
FIG. 4 is a schematic flowchart of S31 in FIG. 3.

S33. Keep acquiring the ground environment information, and control the flight state of the UAV according to the landing safety judgment information to realize the safe landing of the UAV To better control the UAV to hover and keep still when the landing safety judgment information is dangerous landing information, in some embodiments, referring to FIG. 4, S31 includes the following steps:

S311: Acquire a hovering control command and a corresponding flag bit when the landing safety judgment information is dangerous landing information.

S312: Control the UAV to hover and keep still according to the hovering control command and the flag bit.

Specifically, a motor speed command is calculated by using the hovering control command and the flag bit through a certain algorithm, so that the UAV can realize position and attitude control, that is, the position and attitude of the UAV reach a desired state. In other words, according to the hovering control command and the flag bit, the altitude and position of the UAV are controlled to keep unchanged.

Figure 5:
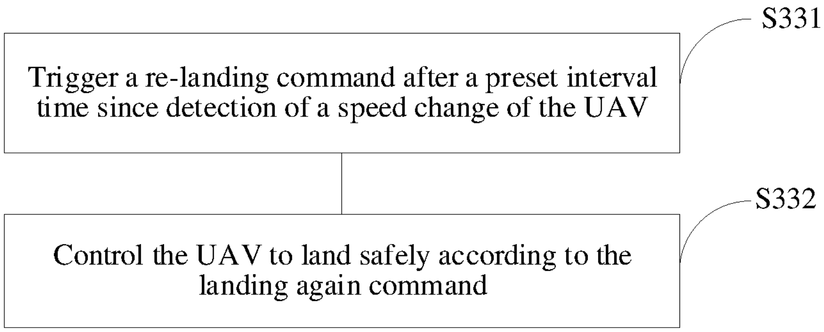
FIG. 5 is a schematic flowchart of S33 in FIG. 3.

To realize a better safe landing of the UAV, in some embodiments, referring to FIG. 5, S33 includes the following steps:

S331: Trigger a re-landing command after a preset interval time since detection of a speed change of the UAV Specifically, after a manual control command is acquired by the UAV, and the UAV is controlled to deviate from the current position according to the manual control command, a speed of the UAV changes correspondingly. The re-landing command is triggered after the preset interval time since detection of the speed change of the UAV

S332: Control the UAV to land safely according to the re-landing command.

Figure 6:
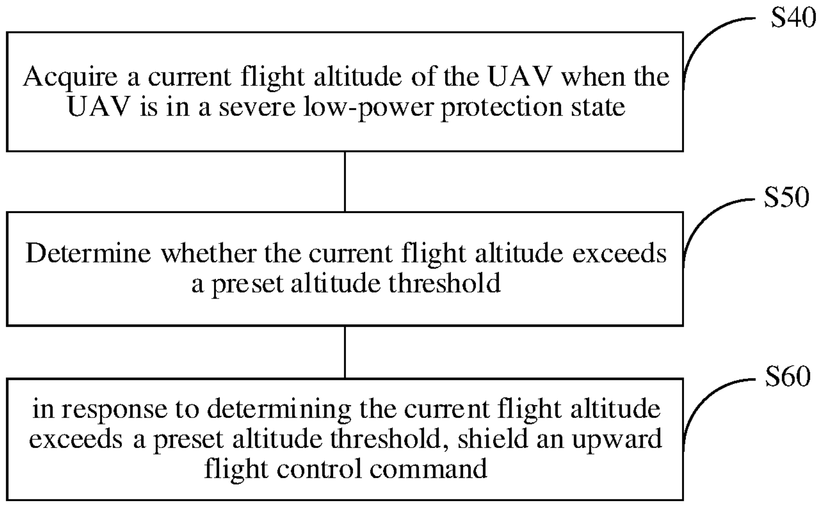
FIG. 6 is a schematic flowchart of a UAV severe low-power protection method according to another embodiment of the present invention.

To better realize the safe landing of the UAV, in some embodiments, referring to FIG. 6, the method further includes the following steps:

S40: Acquire a current flight altitude of the UAV when the UAV is in a severe low-power protection state.

Specifically, an air pressure detection device is used to detect a current flight altitude of the UAV 10. The air pressure detection device includes a barometer, a sensor protective cover and a conduit. The barometer is sealed in the sensor protective cover and mounted on the UAV 10 together with the sensor protective cover. One end of the conduit is communicated with the sensor protection cover, and the other end extends upwards after passing through the sensor protection cover. By arranging the sensor protective cover and the conduit, and setting a nozzle position at the top of the conduit to extend upwards, the present invention can effectively isolate an external environment where the barometer is located from turbulence generated by a paddle rotation. Thus, the barometer can be prevented from being intervened by an unstable air pressure environment, which helps ensure accurate detection of the air pressure altitude.

S50: Determine whether the current flight altitude exceeds a preset altitude threshold.

S60: In response to determining the current flight altitude exceeds a preset altitude threshold, shield an upward flight control command.

It should be noted that, in the foregoing embodiments, the foregoing steps do not necessarily have a certain sequence. Those of ordinary skill in the art may understand according to the description of the embodiments of the present disclosure that in different embodiments, the foregoing steps may have different execution orders, that is, the steps may be executed in parallel, or may be executed interchangeably, etc.

Figure 7:
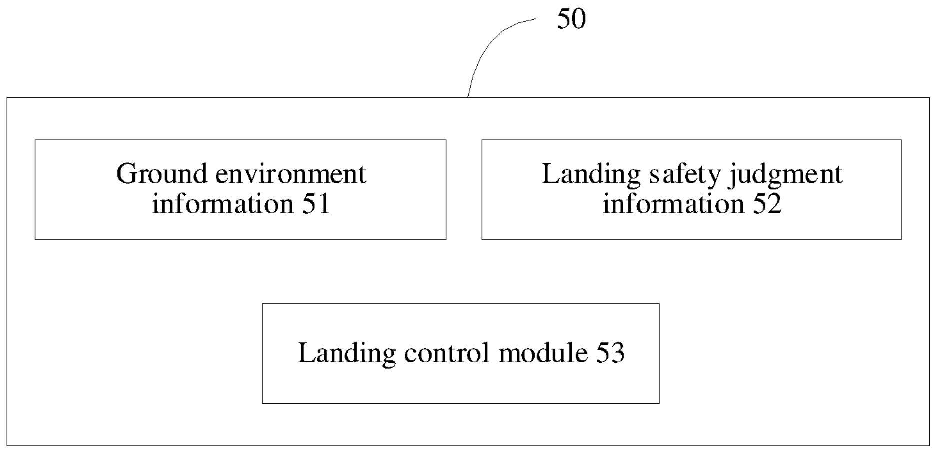
FIG. 7 is a structural block diagram of a UAV severe low-power protection apparatus according to an embodiment of the present invention.

According to another aspect of the embodiments of the present disclosure, the embodiments of the present disclosure provide a UAV severe low-power protection apparatus 50. Referring to FIG. 7, the UAV severe low-power protection apparatus 50 includes: a ground environment acquisition module 51, a landing safety judgment information module 52 and a landing control module 53.

The ground environment acquisition module 51 is configured to acquire ground environment information when the UAV is in a severe low-power protection state.

The landing safety judgment information module 52 is configured to obtain landing safety judgment information according to the ground environment information.

The landing control module 53 is configured to control a flight state of the UAV according to the landing safety judgment information to realize a safe landing of the UAV.

Therefore, in this embodiment, the ground environment information is first acquired when the UAV is in a severe low-power protection state, then landing safety judgment information is obtained according to the ground environment information, and further, the flight state of the UAV is controlled according to the landing safety judgment information to realize the safe landing of the UAV. The foregoing method reduces the probability of explosion of the UAV, avoids injury accidents, and improves flight safety when the UAV is in a severe low-power state.

In some embodiments, the landing control module 53 includes a hovering control unit, a control unit and a safe landing unit.

The hovering control unit is configured to control the UAV to hover and keep still when the landing safety judgment information is dangerous landing information. The landing safety judgment information includes safe landing information and dangerous landing information. The hovering control unit is further configured to acquire a hovering control command and a corresponding flag bit when the landing safety judgment information is dangerous landing information; and control the UAV to hover and keep still according to the hovering control command and the flag bit.

The control unit is configured to acquire a manual control command, and control the UAV to deviate from a current position according to the manual control command.

The safe landing unit is configured to keep acquiring the ground environment information, and control the flight state of the UAV according to the landing safety judgment information to realize the safe landing of the UAV.

In some embodiments, the hovering control unit includes a landing command triggering sub-unit and a safe landing sub-unit.

The landing command triggering sub-unit is configured to trigger a re-landing command after a preset interval time since detection of a speed change of the UAV The safe landing sub-unit is configured to control the UAV to land safely according to the re-landing command.

In some embodiments, the UAV severe low-power protection apparatus 50 further includes a flight height acquisition module, a judgment module and a shielding module.

The light height acquisition module is configured to acquire a current flight altitude of the UAV when the UAV is in a severe low-power protection state.

The judgment module is configured to determine whether the current flight altitude exceeds a preset altitude threshold.

The shielding module is configured to: in response to determining the current flight altitude exceeds a preset altitude threshold, shield an upward flight control command.

It should be noted that the foregoing UAV severe low-power protection apparatus can execute the UAV severe low-power protection method according to the embodiments of the present invention, and has corresponding functional modules and beneficial effects of executing the method. For technical details not described in detail in the embodiments of the UAV severe low-power protection apparatus, reference may be made to the UAV severe low-power protection method according to the embodiments of the present invention.

Figure 8:
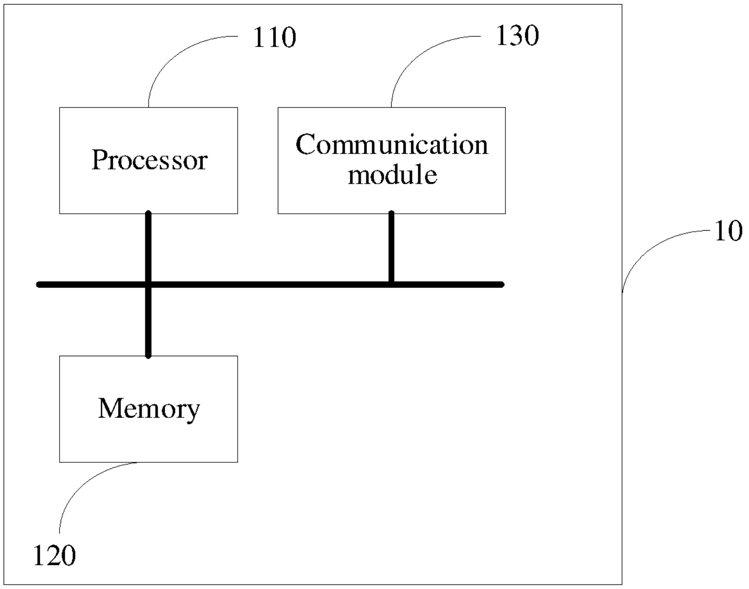
FIG. 8 is a structural block diagram of a UAV according to an embodiment of the present invention.

FIG. 8 is a structural block diagram of a UAV 10 according to an embodiment of the present invention. As shown in FIG. 8, the UAV 10 may include a body, arms, a power apparatus, a magnetometer, various sensors, a flight controller and a communication module 130. The flight controller includes a processor 110 and a memory 120.

The arms are connected to the body. The power apparatus, disposed on the arms, is configured to provide flight power for the UAV The various sensors are configured to collect corresponding flight data respectively. The various sensors may be various sensors among an accelerometer, a gyroscope, a magnetometer, a GPS navigator, and a vision sensor.

A communication connection between any two of the processor 110, the memory 120 and the communication module 130 is established through a bus.

The processor 110 may be any type of processor 110 having one or more processing cores. The processor 110 can execute single-threaded or multi-threaded operations, and is configured to parse commands to execute operations such as acquiring data, executing logical operation functions and issuing operation processing results.

As a non-transitory computer-readable storage medium, the memory 120 may be configured to store a non-transitory software program, a non-transitory computer executable program and a module, for example, program instructions/modules corresponding to the UAV severe low-power protection method in the embodiments of the present invention (for example, the ground environment acquisition module 51, the landing safety judgment information module 52 and the landing control module 53 shown in FIG. 7). The processor 110 executes various functional disclosures and data processing of the UAV severe low-power protection apparatus 50 by operating the non-transitory software program, the instruction and the module stored in the memory 120, that is, the UAV severe low-power protection method in any of the foregoing method embodiments is implemented.

The memory 120 may include a program storage area and a data storage area. The program storage area may store an operating system and an disclosure program required by at least one function. The data storage area may store data created according to the use of the UAV severe low-power protection apparatus 50 and the like. In addition, the memory 120 may include a high-speed random access memory, and may further include a non-transitory memory, such as at least one magnetic disk storage device, a flash memory or another non-transitory solid-state storage device. In some embodiments, the memory 120 optionally includes memories arranged remotely relative to the processor 110, and these remote memories may be connected to the UAV 10 through a network. Examples of the foregoing network include, but are not limited to, the Internet, an intranet, a local area network, a mobile communication network, and a combination thereof.

The memory 120 stores instructions executable by the at least one processor 110. The instructions are executed by the at least one processor 110, to realize the UAV severe low-power protection method in any of the foregoing method embodiments. For example, the foregoing method steps, such as S10, S20, S30, are executed to implement functions of the modules 51 to 53 in FIG. 7.

The communication module 130 is a functional module configured to establish a communication connection and provide a physical channel. The communication module 130 may be any type of wireless or wired communication module 130, including but not limited to a WiFi module or a Bluetooth module.

Further, the embodiments of the present invention further provide a non-transitory computer-readable storage medium, storing computer-executable instructions. The computer-executable instructions, when being executed by one or more processors 110 such as one processor 110 in FIG. 8, may cause the foregoing one or more processors 110 to execute the UAV severe low-power protection method in any of the foregoing method embodiments. For example, the foregoing method steps, such as S10, S20, S30, are executed to implement functions of the modules 51 to 53 in FIG. 7.

Compared with the related art, the UAV severe low-power protection method according to an embodiment of the present invention can first acquire ground environment information when the UAV is in a severe low-power protection state, then obtain landing safety judgment information according to the ground environment information, and further control a flight state of the UAV according to the landing safety judgment information to realize a safe landing of the UAV. The foregoing method reduces the probability of explosion of the UAV, avoids injury accidents, and improves flight safety when the UAV is in a severe low-power state.

The foregoing described apparatus embodiments are merely examples. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments.

Through the descriptions of the foregoing implementations, a person of ordinary skill in the art may clearly understand that the implementations may be implemented by means of software and a general hardware platform, and certainly, may also be implemented by hardware. A person of ordinary skill in the art may understand that all or some of the processes of the methods in the foregoing embodiments may be implemented by a computer program instructing relevant hardware. The computer program may be stored in a non-transitory computer-readable storage medium. The computer program includes program instructions, and the program instructions, when being executed by a related device, may cause the related device to execute a process of the embodiments of any of the foregoing method. The storage medium may be a magnetic disk, an optical disc, a read-only memory (ROM), a random access memory (RAM) or the like.

The foregoing product can execute the UAV severe low-power protection method according to the embodiments of the present invention, and has corresponding functional modules and beneficial effects of executing the UAV severe low-power protection method. For technical details not described in detail in this embodiment, reference may be made to the UAV severe low-power protection method according to the embodiments of the present invention.

Finally, it should be noted that, the foregoing embodiments are merely used for illustrating rather than limiting the technical solutions of the present invention. According to the idea of the present invention, technical features in the foregoing embodiments or in different embodiments may also be combined. Steps may be implemented in any order and there exist many other changes on different aspects of the present invention described above. For brevity, the changes are not provided in details. Although the present invention is described in detail according to the foregoing embodiments, a person of ordinary skill in the art should understand that modifications may be made on the technical solutions recorded in the foregoing embodiments or equivalent replacements may be made on some of the technical features thereof. These modifications or replacements do not cause the essence of the corresponding technical solutions to depart from the scope of the technical solutions of the embodiments of the present invention.

What is claimed is:

1. An unmanned aerial vehicle (UAV) severe low-power protection method, applicable to a UAV, comprising:

acquiring ground environment information when the UAV is in a severe low-power protection state;

obtaining landing safety judgment information according to the ground environment information;

controlling a flight state of the UAV according to the landing safety judgment information to realize a safe landing of the UAV;

controlling the UAV to hover and keep still when the landing safety judgment information is dangerous landing information;

while controlling the UAV to hover, acquiring a manual control command, and controlling the UAV to deviate from a current position according to the manual control command; and keeping acquiring the ground environment information, and controlling the flight state of the UAV according to the landing safety judgment information to realize the safe landing of the UAV.

2. The method according to claim 1, wherein the controlling the UAV to hover and keep still when the landing safety judgment information is dangerous landing information comprises:

acquiring a hovering control command and a corresponding flag bit when the landing safety judgment information is dangerous landing information; and controlling the UAV to hover and keep still according to the hovering control command and the flag bit.

3. The method according to claim 2, wherein the controlling the UAV to hover and keep still according to the hovering control command and the flag bit comprises:

controlling an altitude and a position of the UAV to keep unchanged according to the hovering control command and the flag bit.

4. The method according to claim 1, wherein the method further comprises:

controlling the UAV to deviate from the current position according to the manual control command, and controlling the UAV flies to an area suitable for landing.

5. The method according to claim 1, wherein the method further comprises:

triggering a re-landing command after a preset interval time since detection of a speed change of the UAV; and controlling the UAV to land safely according to the re-landing command.

6. The method according to claim 5, wherein the method further comprises:

acquiring a current flight altitude of the UAV when the UAV is in the severe low-power protection state;

determining whether the current flight altitude exceeds a preset altitude threshold; and in response to determining the current flight altitude exceeds the preset altitude threshold, shielding an upward flight control command.

7. An unmanned aerial vehicle (UAV) severe low-power protection apparatus, applicable to a UAV, comprising:

at least one processor; and a memory communicatively connected to the at least one processor, the memory storing instructions executable by the at least one processor, the instructions, when executed by the at least one processor, enabling the at least one processor to perform the following operations:

acquiring ground environment information when the UAV is in a severe low-power protection state;

obtaining landing safety judgment information according to the ground environment information;

controlling a flight state of the UAV according to the landing safety judgment information to realize a safe landing of the UAV;

controlling the UAV to hover and keep still when the landing safety judgment information is dangerous landing information;

while controlling the UAV to hover, acquiring a manual control command, and controlling the UAV to deviate from a current position according to the manual control command; and keeping acquiring the ground environment information, and controlling the flight state of the UAV according to the landing safety judgment information to realize the safe landing of the UAV.

8. The apparatus according to claim 7, wherein the at least one processor is further performs the following operations:

acquiring a hovering control command and a corresponding flag bit when the landing safety judgment information is dangerous landing information; and controlling the UAV to hover and keep still according to the hovering control command and the flag bit.

9. The apparatus according to claim 8, wherein the at least one processor further performs the following operations:

controlling an altitude and a position of the UAV to keep unchanged according to the hovering control command and the flag bit.

10. The apparatus according to claim 7, wherein the at least one processor further performs the following operations:

controlling the UAV to deviate from the current position according to the manual control command, and controlling the UAV flies to an area suitable for landing.

11. The apparatus according to claim 10, wherein the at least one processor further performs the following operations:

triggering a re-landing command after a preset interval time since detection of a speed change of the UAV; and controlling the UAV to land safely according to the re-landing command.

12. The apparatus according to claim 7, wherein the at least one processor further performs the following operations:

acquiring a current flight altitude of the UAV when the UAV is in the severe low-power protection state;

determining whether the current flight altitude exceeds a preset altitude threshold; and in response to determining the current flight altitude exceeds the preset altitude threshold, shielding an upward flight control command.

13. An unmanned aerial vehicle (UAV), comprising:

a body;

arms, connected to the body;

a power apparatus, disposed on the arms, configured to provide flight power for the UAV; and a flight controller, disposed on the arms;

a ground detection sensor, configured to acquire ground environment information;

wherein the flight controller comprises:

at least one processor;

a memory communicatively connected to the at least one processor, the memory storing instructions executable by the at least one processor, the instructions, when executed by the at least one processor, enabling the at least one processor to perform the following operations:

acquiring ground environment information when the UAV is in a severe low-power protection state;

obtaining landing safety judgment information according to the ground environment information;

controlling a flight state of the UAV according to the landing safety judgment information to realize a safe landing of the UAV;

controlling the UAV to hover and keep still when the landing safety judgment information is dangerous landing information;

while controlling the UAV to hover, acquiring a manual control command and controlling the UAV to deviate from a current position according to the manual control command; and keeping acquiring the ground environment information, and controlling the flight state of the UAV according to the landing safety judgment information to realize the safe landing of the UAV.

14. The unmanned aerial vehicle according to claim 13, wherein the at least one processor further performs the following operations:

acquiring a hovering control command and a corresponding flag bit when the landing safety judgment information is dangerous landing information; and controlling the UAV to hover and keep still according to the hovering control command and the flag bit.

15. The unmanned aerial vehicle according to claim 14, wherein the at least one processor further performs the following operations:

controlling an altitude and a position of the UAV to keep unchanged according to the hovering control command and the flag bit.

16. The unmanned aerial vehicle according to claim 13, wherein the at least one processor further performs the following operations:

controlling the UAV to deviate from the current position according to the manual control command, and controlling the UAV flies to an area suitable for landing.

17. The unmanned aerial vehicle according to claim 13, wherein the at least one processor further performs the following operations:

triggering a re-landing command after a preset interval time since detection of a speed change of the UAV; and controlling the UAV to land safely according to the re-landing command.

18. The apparatus according to claim 17, wherein the at least one processor further performs the following operations:

acquiring a current flight altitude of the UAV when the UAV is in the severe low-power protection state;

determining whether the current flight altitude exceeds a preset altitude threshold; and in response to determining the current flight altitude exceeds the preset altitude threshold, shielding an upward flight control command.

* * * * *